Sept. 4, 1934.    A. O. AUSTIN    1,972,614
INSULATOR
Filed June 23, 1930    3 Sheets-Sheet 1

INVENTOR
ARTHUR O. AUSTIN
BY Alpheus J. Crane
ATTORNEY

Sept. 4, 1934. A. O. AUSTIN 1,972,614
INSULATOR
Filed June 23, 1930 3 Sheets-Sheet 2

INVENTOR
ARTHUR O. AUSTIN
BY Alpheus J. Crane
ATTORNEY

Patented Sept. 4, 1934

1,972,614

UNITED STATES PATENT OFFICE 1,972,614

INSULATOR

Arthur O. Austin, near Barberton, Ohio, assignor, by mesne assignments, to The Ohio Brass Company, Mansfield, Ohio, a corporation of New Jersey Application June 23, 1930, Serial No. 462,982

16 Claims. (Cl. 173—318)

This invention relates to insulators and particularly insulators subjected to high mechanical stresses, and has for one of its objects the provision of various forms of insulator structures which will support heavy mechanical loads and withstand heavy forces without endangering the dielectric member.

Another object of the invention is to provide an insulator joint which is applicable to insulators of large dimensions and which will prevent undue stresses from being set up by temperature changes.

A further object is to provide devices of the class named which shall be of improved construction and operation.

Other objects and advantages will appear from the following description.

The invention is exemplified by the combination and arrangement of parts shown in the accompanying drawings and described in the following specification, and it is more particularly pointed out in the appended claims.

In constructing transmission lines to operate at very high voltages, it is difficult to obtain the necessary mechanical strength, particularly where a rigid type of insulator is used for bus construction, disconnecting switches and other purposes. In order to secure sufficient mechanical strength and rigidity, it is necessary to use large metal parts but where this is done, the difference in the temperature coefficient of expansion of the metal and porcelain parts causes excessive stresses to be set up under the different temperatures encountered in operation. These so-called thermal stresses are likely to produce failure of the dielectric members. Where the thermal stress and the stress due to the load combine so as to approach the permissible limiting stress in the dielectric, the effective load which may be placed upon the insulator is reduced.

In the improved construction, it is possible to eliminate a large part of the thermal stress and, at the same time, distribute the mechanical load, permitting the use of parts having a large moment of inertia without setting up an undue stress in the dielectric. When it is taken into account that the radial movement in a metal part, caused by expansion or contraction for temperature changes, increases directly as the diameter of the part, and the amount of relief which may be afforded for the difference in expansion between the dielectric and the metal parts is practically the same regardless of diameter, it is seen that the problem of relieving thermal stresses becomes very difficult where parts having large diameters are necessary to obtain strength and rigidity or where metal parts having large areas are attached to the dielectric.

Figure 5:
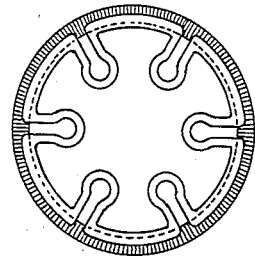
Fig. 5 is a top plan view of the pin shown in Fig. 4.
Figure 2:
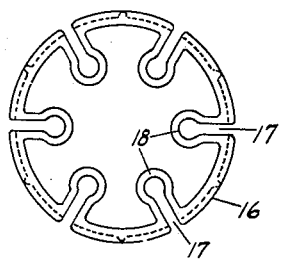
Fig. 2 is a top plan view of the supporting pin of the structure shown in Fig. 1.
Figure 6:
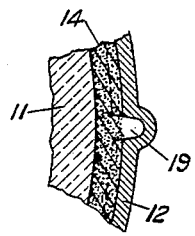
Fig. 6 is a section on line 6—6 of Fig. 1.
Figure 1:
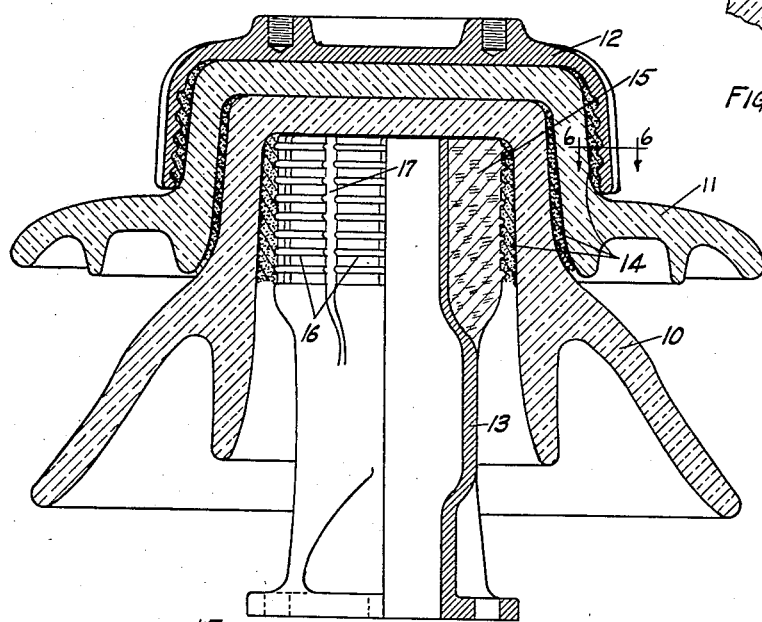
Fig. 1 is a vertical, sectional view of a pin type insulator having one embodiment of the present invention applied thereto.
Figure 4:
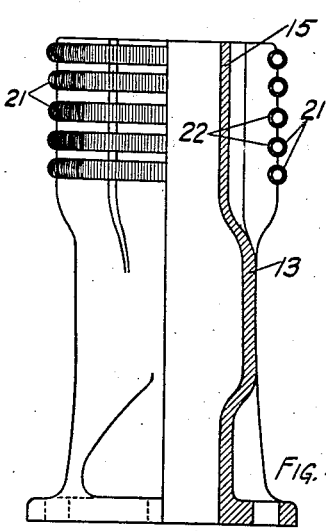
Fig. 4 is an elevation with parts in section showing a modified form of pin.

In the form of the invention shown in Fig. 1, the dielectric members 10 and 11 are equipped with a metal cap 12, and a pin 13. The several parts are held together with cement joints 14. As the effective mechanical strength of the insulator parts increases approximately as the square of the diameter, it is seen that the relatively large diameter of the pin 13 cemented to the dielectric member 11 provides a high mechanical ultimate strength for bending moments. Where several members are cemented together, some relief for thermal stresses may be obtained by the use of a resilient joint, as shown in my prior Patent No. 1,284,975 November 19, 1918, and in the construction shown in my Patent No. 1,281,268 October 15, 1918, but for very large members it is desirable to provide control of the stress set up in the dielectric over a wider range. In Fig. 1 a pin 13 having a resilient head 15 is used. In order to provide resiliency for the radial stresses, the pin is provided with recesses or expansion joints which relieve the rigidity of a cylindrical construction. Where a cylindrical section is used, the wall forms a complete compression band or arch so that any expansion in the metal will set up a high stress in the dielectric. This may be relieved as shown more clearly in Fig. 2. The bearing surfaces 16 may be corrugated, ribbed or roughened in any convenient manner so that they will grip the cement joint, or the surface of an adjacent dielectric. The arch formed by the cylindrical wall is broken by radial recesses 17. These recesses are terminated inwardly by the walls 18 which are a continuation of the outer wall 16. It is evident that the construction shown permits the slots 17 to be closed by a force tending to place the outer shell 16 in compression, thereby providing resiliency. The amount of this resiliency can be determined by well-known mechanical laws or by experiment and may be made to vary widely to suit conditions. The same construction may be applied to the cap as to the pin. In the case of the cap pockets 19, shown in Fig. 6, are provided. In the assembly of the insulator, the surfaces of the pockets 17 and 19 are coated with wax or other yielding material which will permit of compression without setting up high mechanical stress. The entire pocket may be filled with wax, cork or other yielding material 17' as shown in Fig. 1 of the drawing which will prevent the filling of the space with cement which would destroy its resiliency. The amount of resiliency may be controlled by the thickness of the coating, so that when the metal parts are moved the stiffness of the wall will be supplemented by the bearing upon the cement. In general, longitudinal movement is not as serious as radial movement in insulators where high rigidity is desired, as it is possible to develop rigidity to much better advantage by using a large diameter and a short length. The grooves 17, instead of being directly longitudinal, may be helical, in which case they will provide both longitudinal and radial resiliency. A thin disc is placed over the top of the pin to close the opening in the upper end of the head 15.

An improved type of construction which will permit even greater control of the stress set up in the dielectric by differences in expansion and by the working loads is afforded by equipping the pins and caps with a resilient member which will further supplement the distribution of stress. In the improved type of construction, it is possible to provide for the forces in tension, compression and torsion. The mechanical construction is such that the cost is relatively low for the result secured. Heretofore, bearing surfaces between the metal and dielectric members of insulators having tubular, spiral spring or helical members inserted in the joint have not operated satisfactorily as they do not have the desired rigidity. In many cases a slight torsional moment on devices heretofore attempted would cause the collapse of the joint and the failure of the device. In the present invention these limitations have been overcome and a construction provided which permits of easy assembly and control of the mechanical stresses in the dielectric to a very large extent. In Fig. 1 the resilient pin is cemented directly into the insulator.

Figure 3:
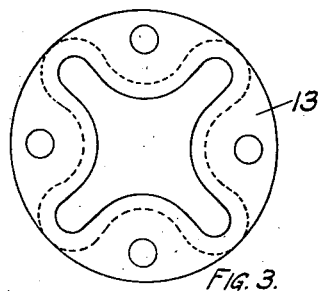
Fig. 3 is a bottom plan view of the supporting pin shown in Fig. 1.

Fig. 3 shows the pin 13 equipped with helical springs 21 forming continuous spaced bands about the head 15 and seated in grooves 22. These springs are readily made either from steel or a non-ferrous metal.

It is evident that without some means for locking helical springs 21 in the grooves 22 of the pin surfaces 16 the construction would not be suitable for developing a high torsional moment. By proportioning the grooves and the members 21 so that they will approximately conform, it is possible to assemble the members and then dip in a galvanizing or other molten bath which will insure a tight bond. Under some conditions this may be effected by electric welding or they may be brazed in place with brass. Attached in this way the members 21 provide a very efficient surface for gripping the cement for stresses in all directions. If the individual members are small, they can be used to distribute or limit mechanical stress for forces having components in either a radial, longitudinal or tangential direction. While the connection permits yielding in all directions, the fact that the individual convolutions are rigidly fixed to the fitting limits the movement to safe limits, so that there is no danger of the pin bursting out the head of the insulator or other damage occurring during transportation or under variations of load conditions. It is evident that the space between the turns in the helical springs 21 does not interfere with the resiliency of the body portion of the pin head. With this type of construction, it is possible to dip the whole pin head into wax or other material which will restrict the bearing surfaces of the cement almost entirely to the projecting portions of the helical springs 21. The bearing will then come between these rather small sections of metal which act as so many separate springs. The control of the stress may be determined by well-known mechanical laws. It is evident that where a given size of wire or section is used in the spring 21, increasing the number of turns per inch, will increase the effective rigidity, and conversely, decreasing the number of turns or using a smaller cross section in the wire will decrease the effective rigidity. As stated before, the members 21 may be of any suitable section; the members being made of round, rectangular, flat or irregular shape. Where sufficient resiliency is provided by the resilient member 21, the pin and cap bodies may be made without the resilient pockets or slots 17 and 19.

Figure 7:
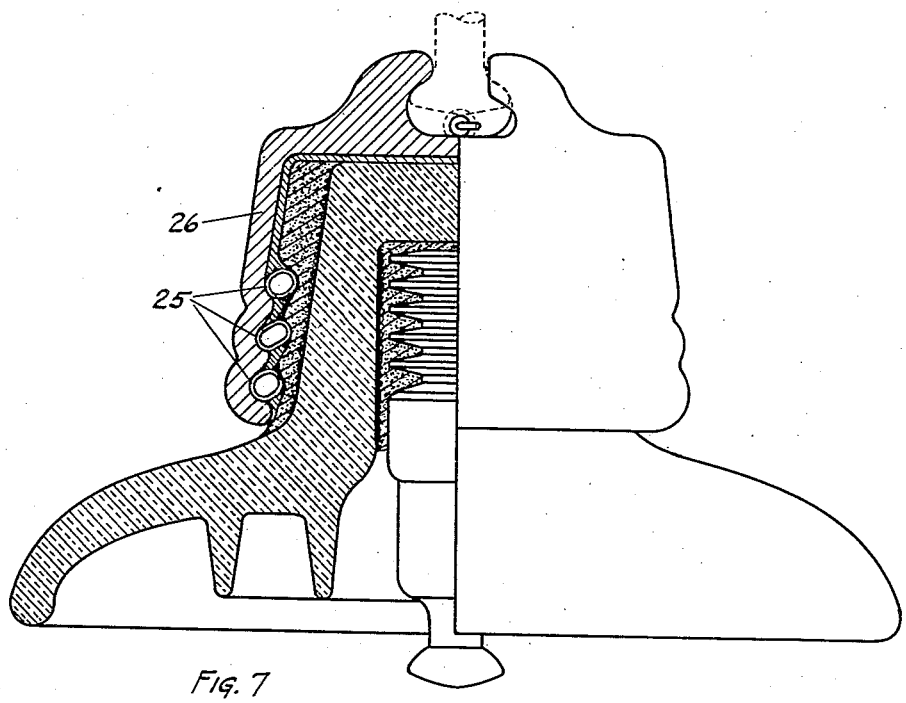
Fig. 7 is a part elevation and part section of another form of the invention.

The rigidity may be further controlled in certain directions by using elliptical or other shape of section which will fit into suitable grooves as shown at 25 in Fig. 7. This construction is particularly applicable where insulators are used for very high tensions or where it is desired to compensate for a radial or longitudinal deformation in the parts due to loading. A plurality of spring rings can be employed and their contour varied as shown in the drawing to grade the distribution of the load where this is desired. The spring bands 25 are inserted in the grooves in the cap 26 and may be secured in place by galvanizing. By whirling the cap about its axis while the zinc is still molten, the spelter will be caused to gather in the grooves by centrifugal force and form an even coating holding the outer portions of the loops of the springs 25 in place in the grooves.

Figure 8:
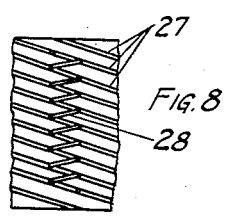
Fig. 8 is a fragmentary, vertical section of a different modification.
Figure 9:
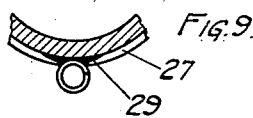
Fig. 9 is a horizontal section of the form shown in Fig. 8.

In Fig. 1 the resilient members 21 are shown in grooves and in a plane at right angles to the axis of the cemented members. They may, however, be disposed vertically by inserting the individual turns in narrow spiral grooves, as shown at 27 in Figs. 8 and 9, or they may be disposed in vertical grooves if desired. The springs 28 may be held in place by galvanizing, welding or brazing as indicated at 29.

Figure 10:
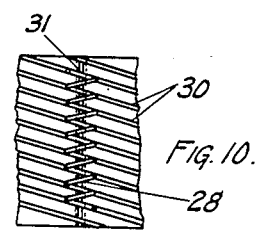
Fig. 10 is a fragmentary elevation of another modification of the invention.
Figure 11:
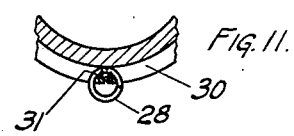
Fig. 11 is a horizontal section of the form shown in Fig. 10.

In the form illustrated in Figs. 10 and 11 the grooves 30 are deeper than the grooves 27 and key-ways are provided in which keys 31 are inserted to hold the spring 28 in place.

Figures 12, 13:
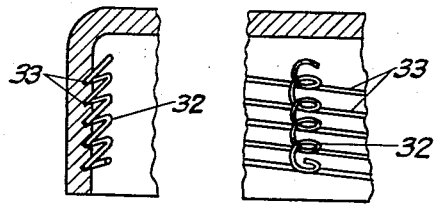
Fig. 12 is a fragmentary vertical section showing another modification of the invention.
Fig. 13 is an elevation of the form shown in Fig. 12.

In Figs. 12 and 13 the individual turns or convolutions of the spring 32 are set in inclined grooves 30 to give the convolutions an upward tilt so as to lie more nearly in the direction of the force imposed upon them.

Figure 15:
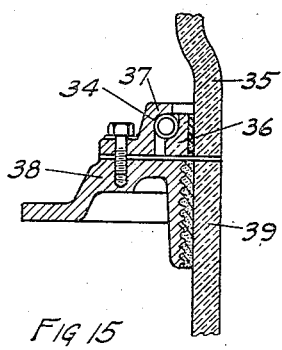
Fig. 15 is a fragmentary vertical section showing another application of the invention.

One application of the invention is for holding the dielectric members used in bushings or other members of large diameter, as shown at 34 in Fig. 15. The porcelain bushing 35 has a rib 36 cemented thereto and a metal flange 37 clamps the helical spring 34 against the rib 36 to hold the member 35 upon its support 38 and against the bushing member 39.

Figure 14:
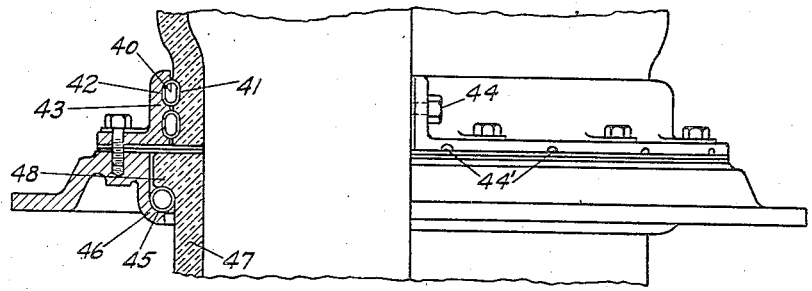
Fig. 14 is a fragmentary elevation with part in section of another modification.

In Fig. 14 the springs 40 are held in grooves 41 in the bushing and in grooves 42 in the flange. The flange 43 is made in two parts and clamped in place by bolts 44. By limiting the rigidity of the bearing springs, it is possible to dispense with the cement entirely in cases where torsional moment is not essential. Where the cement is omitted, the parts may be screwed together or in the case of flanges, as shown in Fig. 14, the parts may be made up in two pieces and secured together after they are in place. The limited mechanical strength of the individual turns of the spring makes it possible to compensate for a very considerable unevenness in the dielectric. Where a material which has considerable resiliency is used, the various parts can be maintained in firm contact over a wide range of temperatures or working stress. Vents 44' may be provided to prevent accumulation of water or the entire space about the springs 40 may be filled with wax or other yielding material. The lower bushing member is held by a spring 45 and flange ring 46 which support the insulator member 47 by a rib 48. The insulator 47 may be lowered into the ring 46 and spring 45 so that the ring 46 need not be split.

Figure 16:
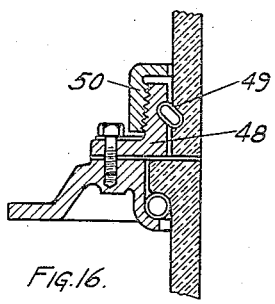
Fig. 16 is a view similar to Fig. 15 showing another modification.

In Fig. 16 the parts of the clamping ring 48 are held together on the spring 49 by a ring 50 that is screwed down or otherwise locked on the split ring 48 after the latter is in place.

Figure 17:
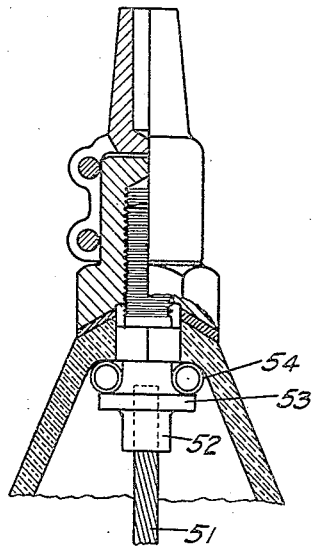
Fig. 17 is a vertical section showing another application of the invention.

In Fig. 17 is shown the application of the invention to a bushing terminal in which the conductor 51 has a contact member 52 secured thereto and provided with a flange 53 which engages the helical spring ring 54 and clamps it against the flange at the upper end of the bushing. A terminal member is threaded on the end of the contact piece 52 and bears on a gasket on the end of the dielectric bushing.

I claim:

1. An insulator pin comprising a tubular member having spaced portions of the wall thereof extending inwardly and forming longitudinally extending slots in the surface of said pin, the inner extremities of said slots being enlarged.

2. An insulator comprising a fitting, a dielectric member secured to said fitting, and a helical spring interposed between said dielectric member and fitting, said spring having the convolutions thereof each, individually fixed to said fitting and held by its attachment to said fitting in an outwardly projecting position relative to the surface of the fitting to prevent the collapse of said spring.

3. An insulator comprising a pin, a dielectric member carried by said pin, and a helical spring extending about said pin and connected with said dielectric member, the convolutions of said spring being fixed to said pin to retain them in radial position and preventing their collapse.

4. An insulator comprising a plurality of parts, and a helical spring interposed between said parts, the individual convolutions of said spring each being rigidly fixed to one of said parts and held in an outwardly projecting position by its attachment to said part to prevent collapse of said convolutions upon relative movement of said parts in the direction of the axis of said spring.

5. An insulator comprising co-axial circular parts, a helical spring interposed between said parts and extending about their common axis, the convolutions of said spring being rigidly fixed to one of said parts to prevent collapse of said spring when said parts are subjected to torsion.

6. An insulator comprising a pin having a circumferential groove therein, a helical spring extending about said pin in said groove, means for securing the convolutions of said spring to said pin to retain them in radial position relative to said pin, and a dielectric member connected to said pin by said spring.

7. In combination an insulator pin having a radially resilient head provided with spaced circumferential grooves, helical springs disposed in said grooves and projecting from said head, and a dielectric member connected with the outer portion of said springs.

8. In combination an insulator fitting, a dielectric member and resilient means for connecting said fitting with said dielectric member, said resilient means comprising spaced resilient loops projecting from said fitting and connected with said dielectric member, said loops being rigidly secured to said fitting at the sides thereof engaging said fitting.

9. In combination an insulator fitting, a dielectric member secured to said fitting, and a resilient contact member interposed between said dielectric member and fitting, said contact member comprising spaced resilient loops galvanized to said fitting at their points of contact with said fitting.

10. An insulator comprising a dielectric member, a fitting therefor and means for transmitting force between said dielectric and fitting, said transmitting means comprising a plurality of spaced contacts projecting from said fitting but fixed thereto to prevent collapse thereof, said projections being resiliently yieldable toward the surface of said fitting and in all directions parallel to said surface but having sufficient resistance, both in the direction of the force of the load on said insulator and also in a direction opposite to said load to arrest relative movement of said dielectric member and fitting within safe limits.

11. An insulator comprising a dielectric member, a metal fitting, cement connecting said fitting to said dielectric member, and means interposed between said cement and fitting to transmit the force of the load and, yieldingly, to resist relative, longitudinal and torsional movement of said dielectric member and fitting, said means comprising a helical spring engaging said cement and having the individual convolutions thereof fixed to said fitting to hold said convolutions in positions in which they project outwardly from the surface of said fitting while permitting said convolutions to yield transversely to the respective planes thereof.

12. A fitting for an insulator comprising a metal member having spaced grooves therein, and a helical spring having the individual convolutions thereof separately inserted in successive grooves in said fitting to secure said spring to said fitting and provide resilient projections for engaging the dielectric member.

13. An insulator comprising a dielectric member having a recess therein, a tubular pin disposed in said recess, cement surrounding said pin for holding said pin in said recess, said pin having re-entrant portions of the walls thereof forming longitudinally extending slots in the surface of the pin to impart radial resiliency to said pin, and means for preventing the cement from filling said slots.

14. An insulator comprising a dielectric member having a recess therein, a tubular pin disposed in said recess, cement surrounding said pin for holding said pin in said recess, said pin having spaced substantially parallel portions of the walls thereof extending inwardly and forming longitudinally extending slots in the surface of said pin to impart radial resiliency to said pin, and means for preventing the cement from filling said slots.

15. An insulator comprising a dielectric member having a recess therein, a tubular pin disposed in said recess, cement surrounding said pin for holding said pin in place, spaced substantially parallel portions of the wall of said pin extending inwardly and forming longitudinally extending slots in the surface of said pin, the inner extremities of said slots being connected by portions of the pin wall resiliently holding the walls of said slots in position, and yielding means disposed in said slots to prevent the cement from filling said slots.

16. An insulator comprising a dielectric member having a recess therein, a pin having a tubular cylindrical head disposed in said recess, the wall of said head having re-entrant portions forming radially and horizontally extending slots to break the arch of said head and permit radial contraction thereof, cement for securing said pin in said recess, and means for excluding the cement from said slots.

ARTHUR O. AUSTIN.